USO12219401B1

(12) United States Patent
Mukherjee et al.

(10) Patent No.: US 12,219,401 B1
(45) Date of Patent: Feb. 4, 2025

(54) SYSTEMS AND METHODS FOR MARKET-BASED COMMUNICATION NETWORK RESOURCE ALLOCATION

(71) Applicant: Cable Television Laboratories, Inc., Louisville, CO (US)

(72) Inventors: Sayandev Mukherjee, Santa Clara, CA (US); Bernardo Huberman, Palo Alto, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 194 days.

(21) Appl. No.: 17/459,633

(22) Filed: Aug. 27, 2021

Related U.S. Application Data

(60) Provisional application No. 63/224,962, filed on Jul. 23, 2021, provisional application No. 63/070,940, filed on Aug. 27, 2020.

(51) Int. Cl.
*H04W 28/18* (2009.01)
(52) U.S. Cl.
CPC .................................. *H04W 28/18* (2013.01)
(58) Field of Classification Search
CPC ..... H04W 28/00; H04W 28/16; H04W 28/18; H04W 28/20; H04W 28/24
See application file for complete search history.

(56) References Cited

U.S. PATENT DOCUMENTS

| 2013/0084878 | A1* | 4/2013 | Chen | H04W 72/56 |
| | | | | 455/452.1 |
| 2016/0328120 | A1* | 11/2016 | Smith | H04W 72/53 |
| 2017/0098274 | A1* | 4/2017 | Phan | H04L 47/72 |
| 2017/0187729 | A1* | 6/2017 | Moskowitz | G06Q 30/0601 |
| 2017/0195891 | A1* | 7/2017 | Smith | H04W 24/02 |
| 2018/0220008 | A1* | 8/2018 | Reith | H04L 47/821 |
| 2018/0351809 | A1* | 12/2018 | Meredith | H04L 43/0882 |
| 2020/0389375 | A1* | 12/2020 | Haze | G06F 9/505 |
| 2021/0390481 | A1* | 12/2021 | Wertheimer | H04L 47/762 |

* cited by examiner

*Primary Examiner* — Kibrom T Hailu
*Assistant Examiner* — Najeeb Ansari
(74) *Attorney, Agent, or Firm* — PdZ Patent Law, PLLC (57) ABSTRACT

A method for market-based allocation of communication network resources includes (1) receiving, at an allocation controller, respective bids for communication network resources from a plurality of clusters of network serving devices, and (2) allocating respective communication network resources among the plurality of clusters of network serving devices at least partially based on an amount of the respective bid from each cluster. A method for market-based mitigation of communication link deterioration includes (1) receiving, at a first client device, a communication network resource budget, (2) determining that deterioration of a first communication link between the first client device and a first network serving device has reached a threshold value, and (3) in response to determining that deterioration of the first communication link has reached the threshold value, generating a bid for additional communication network resources.

11 Claims, 8 Drawing Sheets

SYSTEMS AND METHODS FOR MARKET-BASED COMMUNICATION NETWORK RESOURCE ALLOCATION

RELATED APPLICATIONS

This application claims benefit of priority to each of (a) U.S. Provisional Patent Application Ser. No. 63/070,940, filed on Aug. 27, 2020, and (b) U.S. Provisional Patent Application Ser. No. 63/224,962, filed on Jul. 23, 2021. Each of the aforementioned patent applications is incorporated herein by reference.

BACKGROUND

Wireless communication networks, such as cellular wireless communication networks and Wi-Fi wireless communication networks, require one or more wireless base stations to serve wireless client devices, such as mobile phones. Increasing demand for high bandwidth wireless communication is driving wireless communication network operators to increase density of wireless bases stations, i.e., to increase number of wireless base stations in a geographic area, to increase capacity. Additionally, wireless communication network operators are increasingly using high frequency wireless communication signals, such as millimeter length wireless communication signals, because high frequency wireless communication signals can carry more data and achieve lower latency than low frequency wireless communication signals. High frequency wireless communication signals, however, are easily attenuated, such as by buildings or trees. Therefore, wireless communication networks operating at high frequencies require that base stations be located near wireless client devices, which further drives densification of wireless base stations.

DETAILED DESCRIPTION OF THE EMBODIMENTS

A communication network typically has limited resources, such as bandwidth, to support its constituent elements. For example, consider a wireless communication network including a plurality of clusters, where each cluster includes a plurality of wireless base stations. The wireless communication network will have limited bandwidth to support the clusters, and this limited bandwidth must be shared among the clusters. The wireless communication network could be configured to simply provide bandwidth to the clusters on a first come, first served basis. However, this configuration would allow clusters first requesting bandwidth to consume a disproportionate amount of the available bandwidth, thereby depriving remaining clusters of needed bandwidth. Accordingly, wireless communication networks are commonly configured to allocate communication network resources, such as available bandwidth, among their clusters, so that each cluster can only consume up its allocated amount of communication resources. Similarly, each cluster in a wireless communication network is typically configured to allocate its respective communication network resources among its wireless base stations, so that each wireless base station can only consume up to its allocated portion of the cluster's communication resources.

Communication network resources are conventionally allocated to communication network elements on a static basis, such that the allocation changes infrequently (or the allocation never changes). Communication networks elements, though, typically experience varying load. For example, a first wireless base station in a business district may be heavily loaded during core business hours while a second wireless base station in a residential district may be heavily loaded outside of the core business hours. Accordingly, static allocation of communication network resources typically results in a sub-optimal allocation of the resources. Dynamic communication network resource allocation methods have been proposed, but conventional dynamic communication network resource allocation methods are typically centralized and therefore require substantial signaling, data transmission, and synchronization, between a central controller and network elements. Consequently, conventional dynamic communication network resource allocation methods are not readily scalable, which makes these methods ill-suited for modern wireless communication networks including many wireless base stations.

Disclosed herein are systems and methods for market-based communication network resource allocation which at least partially overcome the above-discussed drawbacks of conventional methods for communication network resource allocation. The new systems and methods dynamically allocate communication network resources, which helps them maintain optimized allocation during changing network operating conditions. Additionally, the market-based properties of the new systems and methods advantageously enable the systems and methods to be decentralized, efficient, fast-acting, scalable, and/or fault tolerant.

Additionally, further disclosed herein are systems and methods for mitigating deterioration of a communication link between a client device, such as a wireless client device, and a network serving device, such as a wireless base station. These new systems and methods promote high communication network performance by mitigating communication link deterioration, and the new systems and methods also reduce the need for client device handoffs between network serving devices. Reducing client device handoffs advantageously reduces communication network overhead and further promotes high communication network performance.

In this document, the term "market-based" means that network elements operate as buyers and sellers of one or more communication network resources. In some embodiments, the actions of one buyer influence the actions of other buyers and determine the prices charged by the sellers for communication network resources being sold. As one example of a market-based approach for communication network resource allocation, consider a scenario where a wireless base station possesses bandwidth needed by several wireless client devices. Each wireless client device may bid for the bandwidth in proportion to the wireless client device's need for the bandwidth, the wireless client device's budget, and/or bids of other wireless client devices. For instance, a wireless client device with an acute need for bandwidth may bid more than a wireless client device with minimal need for bandwidth. The wireless base station may then allocate the bandwidth to the wireless client devices based on their respective bids, such as in proportion to their respective bids, so that each wireless client device purchases its allocated bandwidth from the wireless base station at the price of its respective bid.

Figure 1:
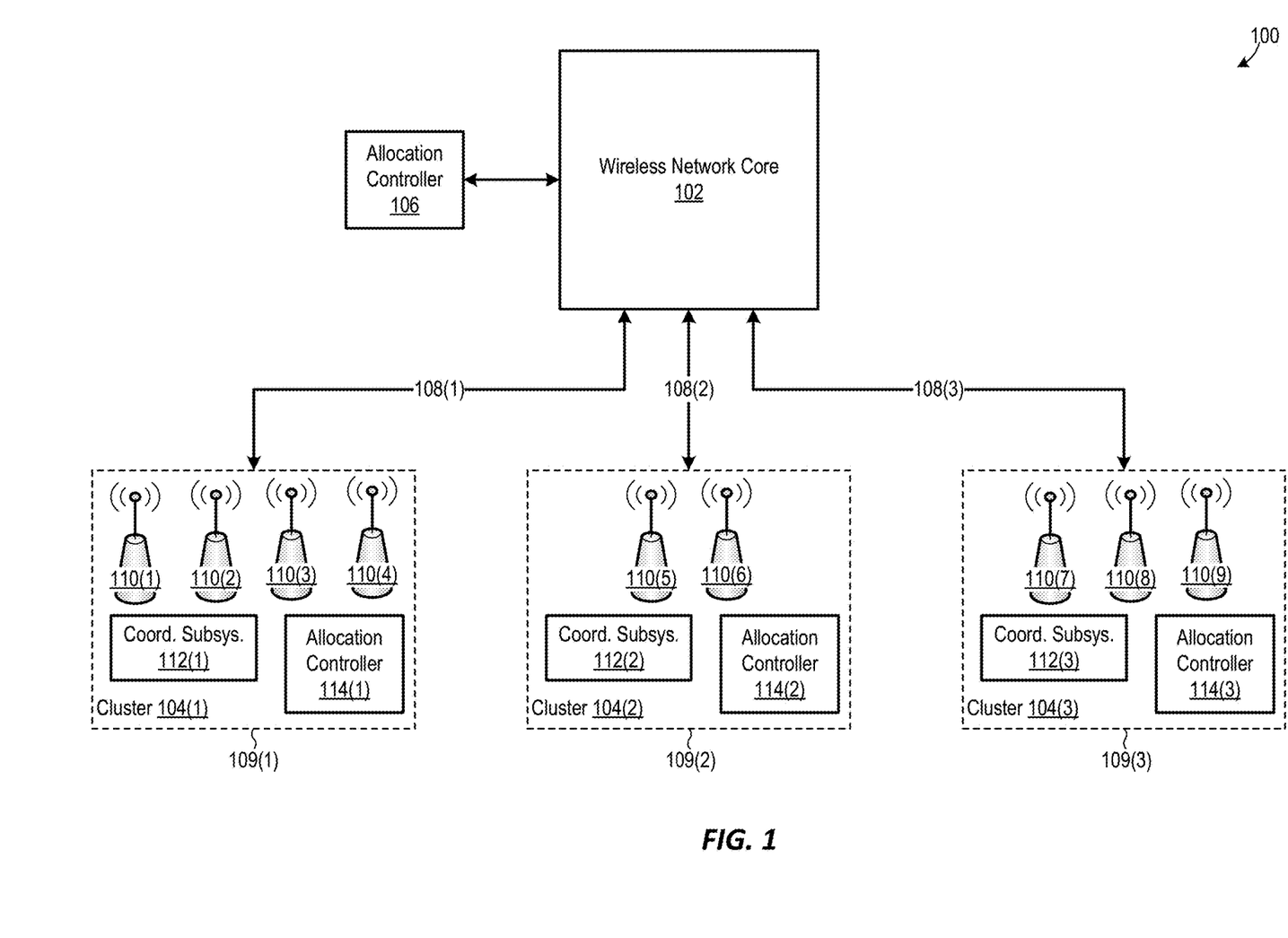
FIG. 1 is a block diagram of a wireless communication network which is configured to automatically allocate communication network resources using market-based principles, according to an embodiment.

FIG. 1 is a block diagram of a wireless communication network 100 which is configured to automatically allocate communication network resources using market-based principles. Wireless communication network 100 includes a wireless core network 102, a plurality of clusters 104, and an allocation controller 106. In this document, specific instances of an item may be referred to by use of a numeral in parentheses (e.g., cluster 104(1)) while numerals without parentheses refer to any such item (e.g., clusters 104). Each cluster 104 is communicatively coupled to wireless network core 102 via a respective logical communication link 108. Each logical communication link 108 includes, for example, a backhaul communication link 108. In some embodiments, logical communication links 108 are embodied by a common physical communication medium, while in some other embodiments, at least two logical communication links 108 are embodied by different respective physical communication mediums. Examples of physical communication mediums for embodying logical communication links 108 include, but are not limited, one or more of an electrical cable, an optical cable, and free space (for radio-frequency wireless communication signal transmission and/or optical communication transmission). Although FIG. 1 depicts wireless communication network 100 as including three clusters 104, the number of clusters 104 of wireless communication network 100 may vary without departing from the scope hereof, as long as wireless communication network 100 includes at least two clusters 104.

Wireless network core 102 provides central control of one or more aspects of wireless communication network 100, and wireless network core 102 optionally also serves as a gateway to external network resources (not shown), such as the public Internet and/or other wireless communication networks. In some embodiments, wireless network core 102 includes one or more of a cellular evolved packet core (EPC), a fifth generation (5G), new radio (NR) cellular wireless network core, and a sixth generation (6G) cellular wireless network core.

Each cluster 104 includes a plurality of wireless base stations 110 in a respective geographic area. Specifically, cluster 104(1) include four wireless base stations 110(1)-110(4) in a first geographic area 109(1), cluster 104(2) includes two wireless base stations 110(5) and 110(6) in a second geographic area 109(2), and cluster 104(3) includes three wireless base stations 110(7)-110(9) in a third geographic area 109(3). However, the number of wireless base stations 110 per cluster 104 may vary. Each wireless base station 110 includes, for example, a long-term evolution (LTE) wireless base station, a 5G NR wireless base station, and/or a 6G wireless base station, operating in licensed radio frequency spectrum and/or in unlicensed radio frequency spectrum.

Each cluster 104 further includes a respective coordination subsystem 112. Each coordination subsystem 112 is configured to coordinate operation of wireless base stations 110 of its respective cluster 104. For example, some embodiments of coordination subsystems 112 are configured to coordinate operation of wireless base stations 110 to perform Coordinated Multi-Point (COMP) communication, where two or more wireless base stations 110 simultaneously communicate with a single wireless client device (not shown). In certain embodiments, each coordination subsystem 112 is configured to coordinate wireless base stations 110 of its respective cluster 104 to perform one or more of coordinated beamforming (CB), joint transmission (JT), and/or dynamic point selection (DPS). In some embodiments, each coordination subsystem 112 is implemented by a computing device (not shown) executing instructions in the form of software and/or firmware stored in a memory (not shown), to perform the functions of the coordination subsystem.

Each cluster 104 additionally includes a respective allocation controller 114. As discussed below, allocation controllers 114 help automatically allocate communication resources within wireless communication network 100 and/or within respective clusters 104, using a market-based approach. In some embodiments, each allocation controller 114 is implemented by a computing device (not shown) executing instructions in the form of software and/or firmware stored in a memory (not shown) to perform the functions of the allocation controller. Within a given cluster 104, the coordination subsystem 112 of the cluster and the allocation controller 114 of the cluster could be partially or fully combined. For example, within a given cluster 104, the coordination subsystem 112 of the cluster and the allocation controller 114 of the cluster could be implemented by a common computing device (not shown) executing instructions in the form of software and/or firmware stored in a memory (not shown) to perform the functions of the coordination subsystem and the allocation controller.

Allocation controller 106 is configured to help automatically allocate communication network resources within wireless communication network 100 using a market-based approach, as discussed below. In some embodiments, allocation controller 106 is at least partially embodied by a computing device (not shown) executing instructions in the form of software and/or firmware to perform the functions of allocation controller 106. Allocation controller 106 could be partially or fully integrated with one or more other elements of wireless communication network 100, such as with wireless network core 102, without departing from the scope hereof.

Wireless communication network 100 is configured to automatically allocate communication network resources among its constituent elements using a two-tier market-based approach. In a first tier, one or more communication resources of wireless communication network 100, such as bandwidth, are automatically allocated among clusters 104 using a market-based approach, where an operator of wireless communication network 100 (represented by allocation controller 106) is a seller, and each cluster 104(represented by its respective allocation controller 114) is a buyer. In a second tier, one or more communication resources of each cluster 104, such as bandwidth and/or cluster antennas, are automatically allocated to respective wireless base stations 110 of the cluster using a market-based approach, where each cluster 104 can sell its respective communication resources to only its constituent wireless base stations 110. Accordingly, the second tier includes the following three sets of buyers and sellers potentially operating in parallel: (a) set one: cluster 104(1) is a seller, and wireless base stations 110(1)-110(4) are buyers; (b) set two: cluster 104(2) is a seller, and wireless base stations 110(5) and 110(6) are buyers; and (c) set three: cluster 104(3) is a seller, and wireless base stations 110(7) and 110(9) are buyers.

Discussed below are several examples of how wireless communication network 100 could perform the first and second tiers of automatic communication network resource allocation. However, wireless communication network 100 is not limited to operating according to the examples below. To the contrary, wireless communication network 100 could be configured to implement essentially market-based approach to perform the first and second tiers of automatic communication network resource allocation. Additionally, some alternate embodiments of wireless communication network 100 are configured to perform solely the first tier or second tier of automatic communication network resource allocation, instead of performing both of the first and second tiers.

Example A—First-Tier

Figure 2:
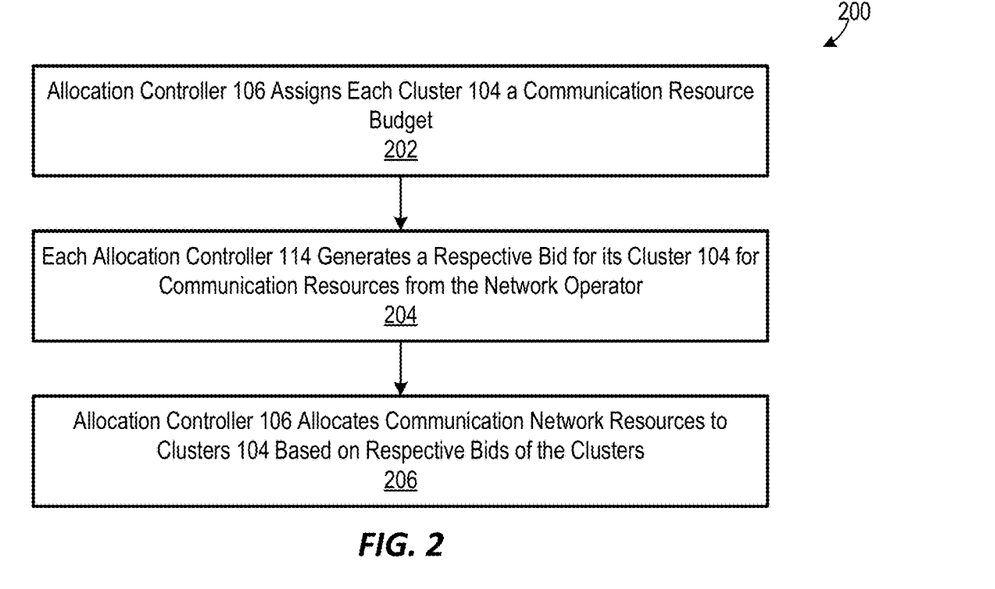
FIG. 2 is a flow chart of a method for a first-tier, automatic, market-based allocation of communication network resources in the FIG. 1 wireless communication network, according to an embodiment.

FIG. 2 is a flow chart of a method 200 for a first-tier, automatic, market-based allocation of communication network resources in wireless communication network 100. In a block 202 of method 200, allocation controller 106 assigns each cluster 104 a finite communication resource budget. Each cluster 104 will use its budget to purchase communication resources from the operator of wireless communication network 100, which is represented by allocation controller 106 and henceforth referred to as the "network operator." Accordingly, each cluster 104 is limited by the amount of its budget to quantity of communication network resources it can purchase from the network operator. Allocation controller 106 is optionally configured to periodically refresh each cluster 104's budget, such as on an hourly basis, a daily basis, a weekly basis, a monthly basis, an as-needed basis, etc. In some embodiment, each cluster 104's budget is virtual, i.e., the budget is not linked to anything of real value. In some other embodiments, each cluster 104's budget is linked to something of real value.

In a block 204 of method 200, each allocation controller 114 generates a respective bid for its cluster 104 for communication network resources of the network operator, where each bid specifies an amount that the cluster 104 is willing to pay for a specified amount of communication network resources. Due to each cluster 104 having a limited budget for purchasing communication network resources, each allocation controller 114 has an incentive to use its budget efficiently, e.g., to only purchase communication network resources that are needed to support its constituent wireless base stations 110. Accordingly, in some embodiments, each allocation controller 114 generates its respective bid at least partially based on a predicted need for communication network resources by the wireless base stations of its cluster 104. For example, allocation controller 114(1) of a cluster 104(1) may generate a relatively large bid if wireless base stations 110(1)-110(4) are predicted to collectively need a large amount of communication network resources, and allocation controller 114(1) may generate a relatively small bid if wireless base stations 110(1)-110(4) are predicted to need a relatively small amount of communication network resources. In some embodiments, each allocation controller 114 is configured to predict need for communication network resources by its cluster 104 based at least partially on machine learning models trained on the history of communication network resource usage and utilization at its respective cluster. It should be noted that predicted need for communication network resources is typically dynamic, and bids generated by clusters 104 will therefore typically vary over time to account for their dynamic communication network resources requirements. Each cluster 104 also sends its respective bid to allocation controller 106 in block 204.

In a block 206 of method 200, allocation controller 106 receives bids from clusters 104, and allocation controller 106 allocates communication network resources to clusters 104 based on amounts of their respective bids, such that allocated communication network resources increase with increasing bid amount. In some embodiments, allocation controller 106 allocates communication network resources to clusters 104 at least partially using a proportional-share allocation technique, where a given cluster 104 is allocated a portion of total communication network resources equal to a ratio of the cluster 104's bid over a sum of all clusters 104s' bids. For example, assume that clusters 104(1), 104(2), and 104(3) generate bids in the amounts of 1, 6, and 3, respectively, as shown in Table 1 below. Cluster 104(1) would be allocated 1/(1+6+3)=0.1 of total communication network resources, as shown in Table 1. Cluster 104(2) would be allocated 6/(1+6+3)=0.6 of total communication network resources, and cluster 104(3) would be allocated 3/(1+6+3)=0.3 of total communication network resources, as shown in Table 1. If the communication network resource being allocated in this example is a total bandwidth of 100 megahertz (MHz), clusters 104(1)-104(3) would be allocated bandwidths of 10 MHz, 60 MHZ, and 30 MHz, respectively.

TABLE 1

| Cluster | Bid | Allocation |
| --- | --- | --- |
| 104(1) | 1 | 0.1 |
| 104(2) | 6 | 0.6 |
| 104(3) | 3 | 0.3 |

Example B—First-Tier

Figure 3:
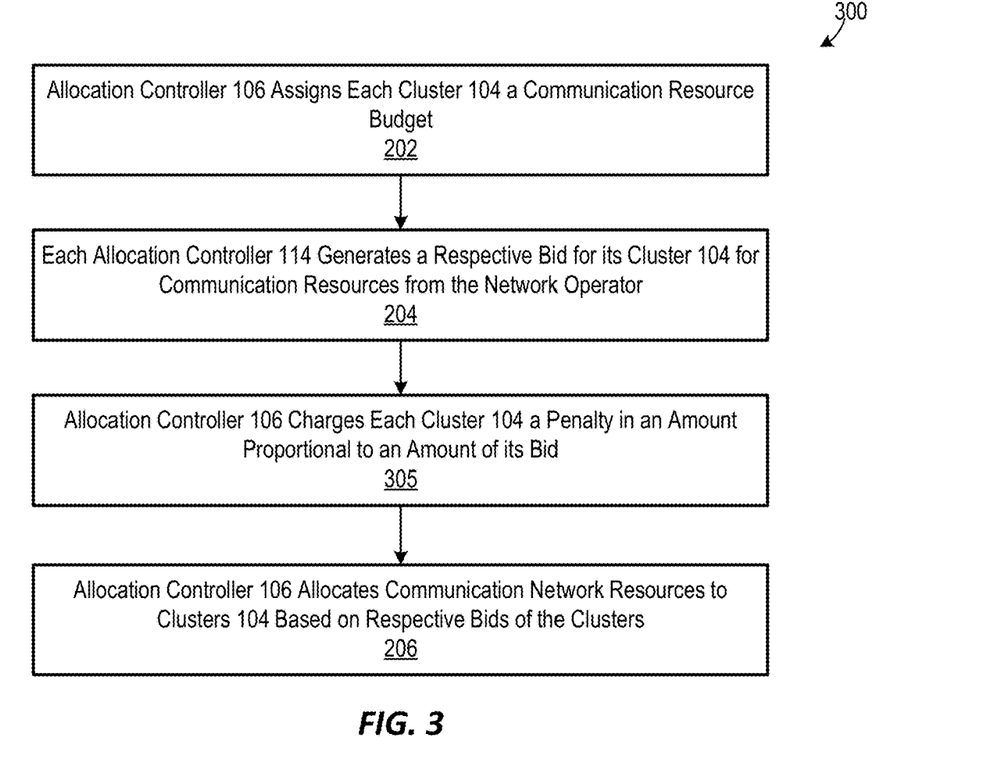
FIG. 3 is a flow chart of another method for a first-tier, automatic, market-based allocation of communication network resources in the FIG. 1 wireless communication network, according to an embodiment.

FIG. 3 is a flow chart of a method 300 for a first-tier, automatic, market-based allocation of communication network resources in wireless communication network 100.

Method 300 is like method 200 of FIG. 2 except that method 300 further includes a block 305. Although block 305 is illustrated as being between blocks 204 and 206, the actions of block 305 need not be performed between the respective actions of blocks 204 and 206. In block 305, allocation controller 106 charges each cluster 104 a penalty that is proportional to the amount of its respective bid (generated in block 204) to disincentivize inflated bids, and allocation controller 106 deducts the penalty from the cluster's communication network resource budget. For example, assume that allocation controller 106 is configured to charge each cluster 104 a penalty of five percent of its bid amount. Allocation controller 106 would charge clusters 104(1)-104(3) respective penalties of 0.05, 0.30, and 0.15 for the bids of Table 1 above.

Example C—First Tier

Figure 4:
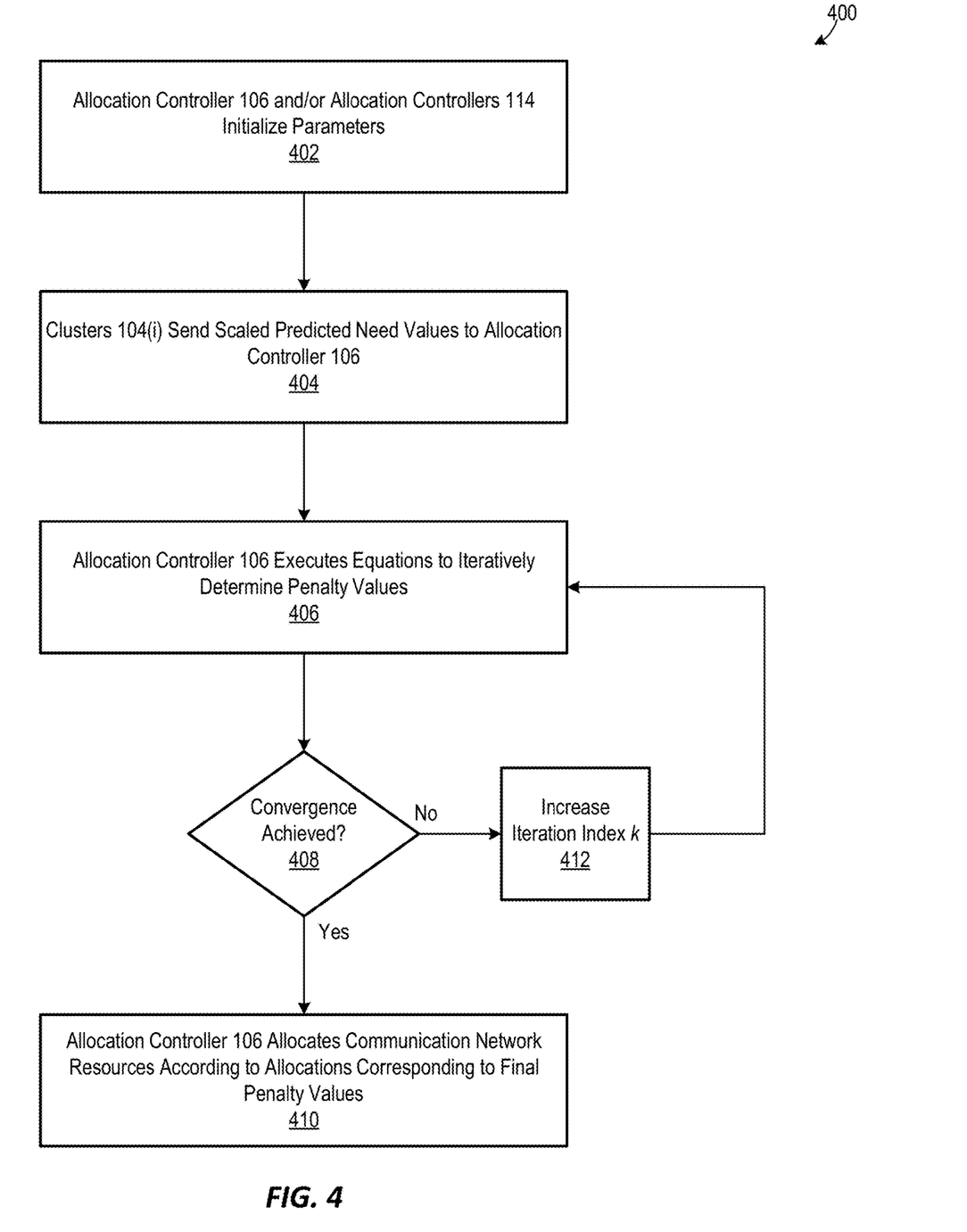
FIG. 4 is a flow chart of another method for a first-tier, automatic, market-based allocation of communication network resources in the FIG. 1 wireless communication network, according to an embodiment.

FIG. 4 is a flow chart of a method 400 for a first-tier, automatic, market-based allocation of communication network resources in wireless communication network 100. In a block 402 of method 400, allocation controller 106 and/or allocation controllers 114 of clusters 104 initialize parameters as follows. First, an initial penalty value, referred to $q_i^{(0)}$, is set to a small arbitrary value for each cluster 104($i$), where i is an index ranging from 1 to n, n is a number of clusters 104 in wireless communication network 100, and "(0)" indicates iteration zero. In the FIG. 1 embodiment, the value of n is equal to three because wireless communication network 100 includes three clusters 104, although n will vary as the number of clusters 104 varies. Second, an initial allocation of communication network resources for each cluster 104 is set according to EQN. 1 below, where $r_i^{(0)}$ is allocation of communication network resources to cluster 104($i$) at iteration zero, and $v_i$ is a predicted need, ranging from zero to one, for communication network resources by cluster 104($i$).

$$r_i^{(0)} = \frac{v_i}{v_1 + v_2 + \ldots v_n}, i = 1, \ldots, n \quad \text{(EQN. 1)}$$

In a block 402 of method 400, an index k representing iteration number is set to one, and each cluster 104 sends a respective scaled predicted need value $S_i$ to allocation controller 106, where $S_i$ is defined in EQN. 2 below. As shown in EQN. 2, $v_i$ is scaled by SE; to generate $S_i$, where SE; refers to effective spectral efficiency of cluster 104($i$) over all of its communication links to its wireless base stations 110.

$$S_i = v_i SE_i, i = 1, \ldots, n \quad \text{(EQN. 2)}$$

In a block 406, allocation controller 106 executes steps (a) through (c) below to iteratively determine penalty values q; for all i=1, . . . , n.

(a) Update $q_i^{(k)}$ for each cluster 104($i$) as follows in EQN. 3 below, where R is total communication network resources to be allocated to all clusters 104, and $\delta$ is a small, positive step size.

$$q_i^{(k)} = q_i^{(k-1)} + \delta \left( \frac{R - r_i^{(k-1)}}{n-1} - \frac{R q_i^{(k-1)}}{\sum_{j=1}^{n} q_j^{(k-1)}} \right) \quad \text{(EQN. 3)}$$

(b) Define $$\rho_i^{(k)} = q_i^{(k)} / \sum_{j=1}^{n} q_j^{(k)},$$

i=1, . . . , n and solve for a real root $X^{(k)}$ of EQN. 4 below.

$$\sum_{j=1}^{n} \frac{1 - [\rho_j^{(k)}/(RS_j)] X^{(k)}}{1 + \rho_j^{(k)} X^{(k)}} = 1 \quad \text{(EQN. 4)}$$

(c) Computer $r_i^{(k)} = (R - \rho_i^{(k)} X^{(k)} / S_i) / (1 + \rho_i^{(k)} X^{(k)})$, i=1, . . . , n.

Block 408 is a decision step where allocation controller 106 determines whether the series $\{q_i^k\}_{k=1}^{\infty}$ has converged. If the result of decision block 408 is yes, method 400 proceeds to block 410. If the result of decision block 408 is no, method 400 proceeds to block 412 where allocation controller 106 increases iteration number index k by one. Method 400 returns to block 406 after block 412 to perform another iteration of steps (a)-(c) above.

In a block 410 of method 400, allocation controller 106 allocates communication resources to clusters 104 according to allocations corresponding to the convergence values (final penalty values) determined above. For example, if convergence is achieved at $q_1^*, \ldots, q_n^*$, then corresponding communication resource allocations $r_1^*, \ldots, r_n^*$ are allocated to clusters 104.

Example D—Second-Tier

Figure 5:
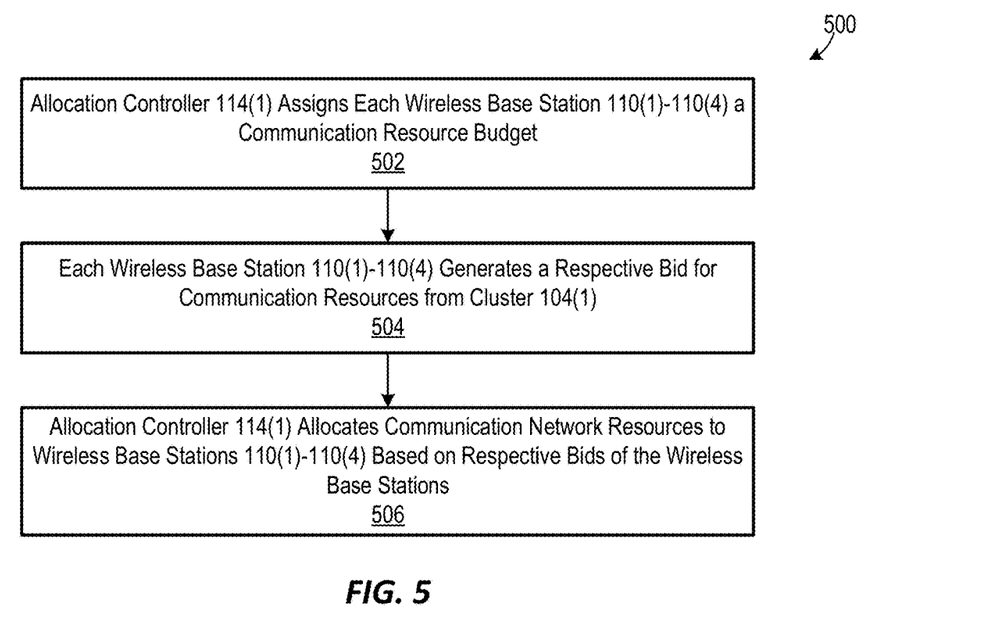
FIG. 5 is a flow chart of a method for a second-tier, automatic, market-based allocation of communication network resources in the FIG. 1 wireless communication network, according to an embodiment.

FIG. 5 is a flow chart of a method 500 for a second-tier, automatic, market-based allocation of communication network resources in wireless communication network 100. Method 500 is discussed with respect to cluster 104(1), but method 500 could be adapted for use with the other clusters 104 of wireless communication network 100.

In a block 502 of method 500, allocation controller 114(1) assigns each wireless base station 110(1)-110(4) a finite communication resource budget. Each wireless base station 110(1)-110(4) will use its budget to purchase communication resources from cluster 104(1), which is represented by allocation controller 114(1). Accordingly, each wireless base station 110(1)-110(4) is limited by the amount of its budget in the quantity of communication network resources it can purchase from cluster 104(1). Allocation controller 114(1) is optionally configured to periodically replenish each wireless base station 110(1)-110(4)'s budget, such as on an hourly basis, a daily basis, a weekly basis, a monthly basis, etc. In some embodiment, each wireless base station 110(1)-110(4)'s budget is virtual, i.e., it is not linked to anything of real value. In some other embodiments, though, each wireless base station 110(1)-110(4)'s budget is linked to something of real value.

In a block 504 of method 500, each wireless base station 110(1)-110(4) generates a respective bid for communication network resources of cluster 104(1), such as bandwidth and/or cluster antenna access, where each bid specifies an amount that a wireless base station 110(1)-110(4) is willing to pay for a particular amount of communication network resources. Due to each wireless base station 110(1)-110(4) having a limited budget for purchasing communication network resources, each wireless base station 110(1)-110(4) has an incentive to use its budget efficiently, e.g., to only purchase communication network resources that are needed to support wireless client devices. Accordingly, in some embodiments, each wireless base station 110(1)-110(4) generates its respective bid at least partially based on its predicted need for communication network resources, i.e., the predicted need for communication resources by client devices. For example, wireless base station 110(1) may generate a relatively large bid if it is predicted to need a large amount of communication network resources, and wireless base station 110(1) may generate a relatively small bid if it is predicted to need a relatively small amount of communication network resources. In some embodiments, each wireless base station 110(1)-110(4) is configured to predict its need for communication network resources based at least partially on machine learning models trained on the history of communication network resource usage and utilization. It should be noted that predicted need for communication network resources is typically dynamic, and bids generated by wireless base stations 110(1)-110(4) will therefore typically vary over time to account for their dynamic communication network resources needs.

In a block 506 of method 500, allocation controller 114(1) allocates communication network resources to wireless base stations 110(1)-110(4) based on their respective bids, such that allocated resources increase with increasing bid amount. In some embodiments, allocation controller 114(1) allocates communication network resources to wireless base stations 110(1)-110(4) at least partially using a proportional-share allocation technique, where a given wireless base station 110(1)-110(4) is allocated a portion of total communication network resources equal to a ratio of the wireless base station's bid over a sum of all wireless base stations' bids in cluster 104(1), in a manner analogous to that discussed above with respect to Example A.

Example E—Second-Tier

Figure 6:
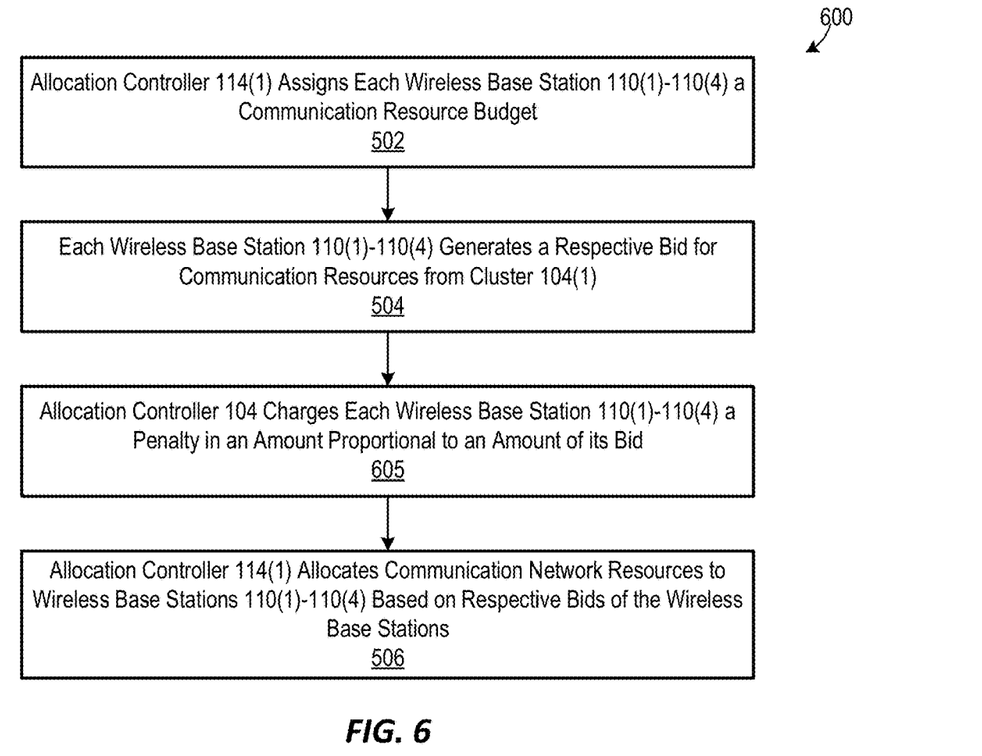
FIG. 6 is a flow chart of another method for a second-tier, automatic, market-based allocation of communication network resources in the FIG. 1 wireless communication network, according to an embodiment.

FIG. 6 is a flow chart of a method 600 for a second-tier, automatic, market-based allocation of communication network resources in wireless communication network 100. Method 600 is like method 500 of FIG. 5 except that method 600 further includes a block 605. Although block 605 is illustrated as being between blocks 504 and 506, the actions of block 605 need not be performed between the respective actions of blocks 504 and 506. In block 605, allocation controller 114(1) charges each wireless base station 110(1)-110(4) a penalty that is proportional to the amount of its respective bid (generated in block 504) to disincentivize inflated bids, and allocation controller 114(1) deducts the penalty from the wireless base station's communication network resource budget.

Example F—Second-Tier

Figure 7:
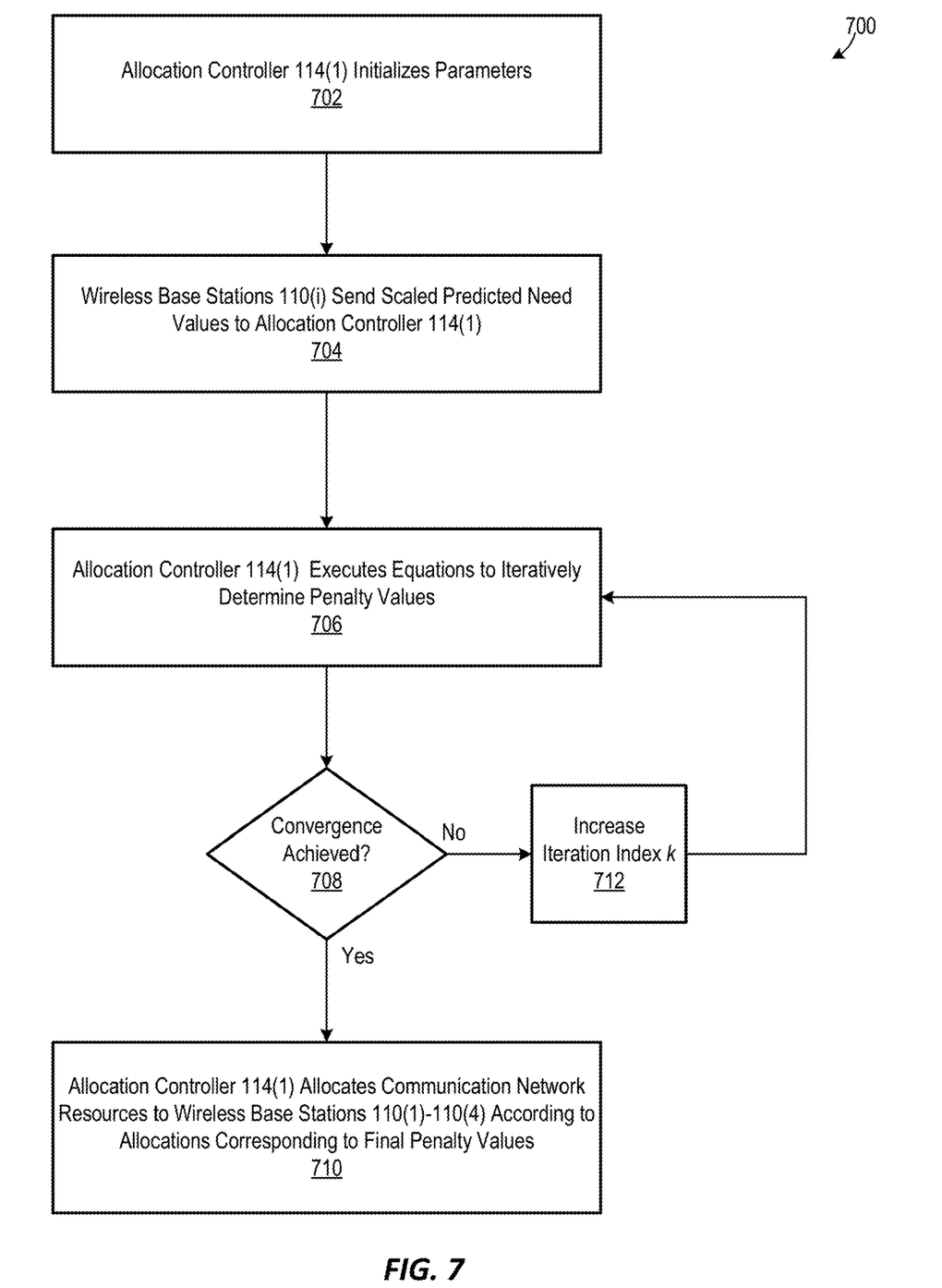
FIG. 7 is a flow chart of another method for a second-tier, automatic, market-based allocation of communication network resources in the FIG. 1 wireless communication network, according to an embodiment.

FIG. 7 is a flow chart of a method 700 for a second-tier, automatic, market-based allocation of communication network resources in wireless communication network 100. Method 700 is discussed with respect to cluster 104(1), but method 700 could be adapted for use with the other clusters 104 of wireless communication network 100. In a block 702 of method 700, allocation controller 114(1) initializes parameters as follows. First, an initial penalty value, referred to $q_i^{(0)}$ is set to a small arbitrary value for each wireless base station 110(1)-110(4), where i is an index ranging from 1 to n, n is a number of wireless base stations 110 in cluster 104(1), and (0) indicates iteration zero. In the FIG. 1 embodiment, the value of n is equal to four because cluster 104(1) includes four wireless base stations 110(1)-110(4), although n will vary as the number of wireless base stations in cluster 104(1) varies. Second, an initial allocation of communication network resources for each wireless base station 110(1)-110(4) is set according to EQN. 5 below, where $r_i^{(0)}$ is allocation of cluster 104(1) communication network resources to wireless base station 104(i) at iteration zero, and $v_i$ is a predicted need for communication network resources by wireless base station 110(i).

$$r_i^{(0)} = \frac{v_i}{v_1 + v_2 + \ldots v_n}, i = 1, \ldots, n \quad \text{(EQN. 5)}$$

In a block 702 of method 700, an index k representing iteration number is set to one, and each wireless base station 110(1)-110(4) sends a respective scaled predicted need value $S_i$ to allocation controller 114(1), where $S_i$ is defined in EQN. 6 below. As shown in EQN. 6, $v_i$ is scaled by $SE_i$ to generate $S_i$, where $SE_i$ refers to effective spectral efficiency of wireless base station 110(i) over all communication links to its wireless client devices.

$$S_i = v_i SE_i, i = 1, \ldots, n \quad \text{(EQN. 6)}$$

In a block 706, allocation controller 114(1) executes steps (a) through (c) below to iteratively determine penalty values $q_i$ for all i=1, ..., n.

(a) Update $q_i^{(k)}$ for each wireless base station 110(i) as follows in EQN. 7 below, where R is total communication network resources to be allocated to all wireless base stations 110(1)-110(4) and $\delta$ is a small positive step size.

$$q_i^{(k)} = q_i^{(k-1)} + \delta\left(\frac{R - r_i^{(k-1)}}{n-1} - \frac{Rq_i^{(k-1)}}{\sum_{j=1}^n q_j^{(k-1)}}\right) \quad \text{(EQN. 7)}$$

(b) Define $$\rho_i^{(k)} = q_i^{(k)} / \sum_{j=1}^n q_j^{(k)},$$

i=1, ..., n and solve for a real root $X^{(k)}$ of EQN. 8 below.

$$\sum_{j=1}^n \frac{1 - [\rho_j^{(k)}/(RS_j)]X^{(k)}}{1 + \rho_j^{(k)} X^{(k)}} = 1 \quad \text{(EQN. 8)}$$

(c) Compute $r_i^{(k)} = (R - \rho_i^{(k)} X^{(k)} / S_i) / (1 + \rho_i^{(k)} X^{(k)})$, i=1, ..., n.

Block 708 is a decision step where allocation controller 114(10 determines whether the series $\{q_i^k\}_{k=1}^\infty$ has converged. If the result of decision block 708 is yes, method 700 proceeds to block 710. If the result of decision block 708 is no, method 700 proceeds to block 712 where allocation controller 114(1) increases iteration number index k by one. Method 700 returns to block 706 after block 712 to perform another iteration of steps (a)-(c) above.

In a block 710 of method 700, allocation controller 114(1) allocates communication resources to wireless base stations 110(1)-110(4) according to allocations corresponding to the convergence values (final penalty values) determined above. For example, if convergence is achieved at $q_1^*, \ldots, q_n^*$, then corresponding communication resource allocations $r_1^*, \ldots, r_n^*$ are allocated to wireless base stations 110(1)-110(4).

Mitigating Deterioration of a Communication Link

While densification of wireless base stations achieves significant benefits, there are some downsides to densification. For example, a given wireless base station in a dense cluster of wireless base stations will typically have a limited range, such as to avoid interference with neighboring base stations and/or due to relatively high attenuation of high frequency communication signals used by the wireless base station. Consequently, a wireless client device, such as a mobile telephone, in a dense urban setting may abruptly experience a significant deterioration in its wireless communication channel with a wireless base station in several scenarios, such as after turning a corner around a tall building or due to a sudden knot of traffic blocking a path between the wireless base station and the wireless client device. While wireless communication networks are usually configured such that total wireless communication channel failure is unlikely before the wireless client device is handed over to a new serving wireless base station or a strong connection is re-established between the wireless base station and the wireless client device, the wireless client device will exhibit a sudden and severe drop in wireless communication link data rate. While this issue has always existed in wireless communication networks, it takes on a new urgency with the ongoing densification of wireless base stations having a limited range. In particular, the small range of wireless base stations in dense clusters causes a wireless client device to move between serving wireless base stations, i.e., to roam among wireless base stations, more frequently than the client device would if it were served by a wireless base station with a large range, such as a macro wireless base station. Consequently, a wireless client device may experience frequent wireless communication channel deterioration when used in an area having a high density of wireless base stations.

Disclosed herein are systems and methods for short term increase in communication network resource allocation which may at least partially overcome the above-discussed problems associated with wireless communication channel deterioration. The new systems and methods are configured to automatically provide a wireless client device with communication resources from one or more additional wireless base stations, such as using a market-based approach, while the wireless client device is experiencing degraded service from its primary serving wireless base station. The communication resources from the one or more additional wireless base stations are in addition to communication resources received from the wireless client device's primary wireless base station. Consequently, data rate drop due to deterioration of a communication link between the primary wireless base station and the wireless client device is at least partially mitigated. The additional resources allocated to the wireless client device are subsequently released, such as after (1) a predetermined amount of time has elapsed and/or (2) quality of the primary communication link has improved to at least a threshold value.

The new system and methods may achieve significant advantages. For example, temporary mitigation of a primary communication link deterioration may eliminate the need for a wireless client device to roam to another wireless base station, or in other words, the mitigation may eliminate the need for the wireless client device to be handed off to another wireless base station. Such reduction in handoff frequency helps improve communication network performance and decreases communication network data processing requirements, because wireless client device handoff is relatively slow and imposes significant overhead on logical control signaling channels.

Figure 8:
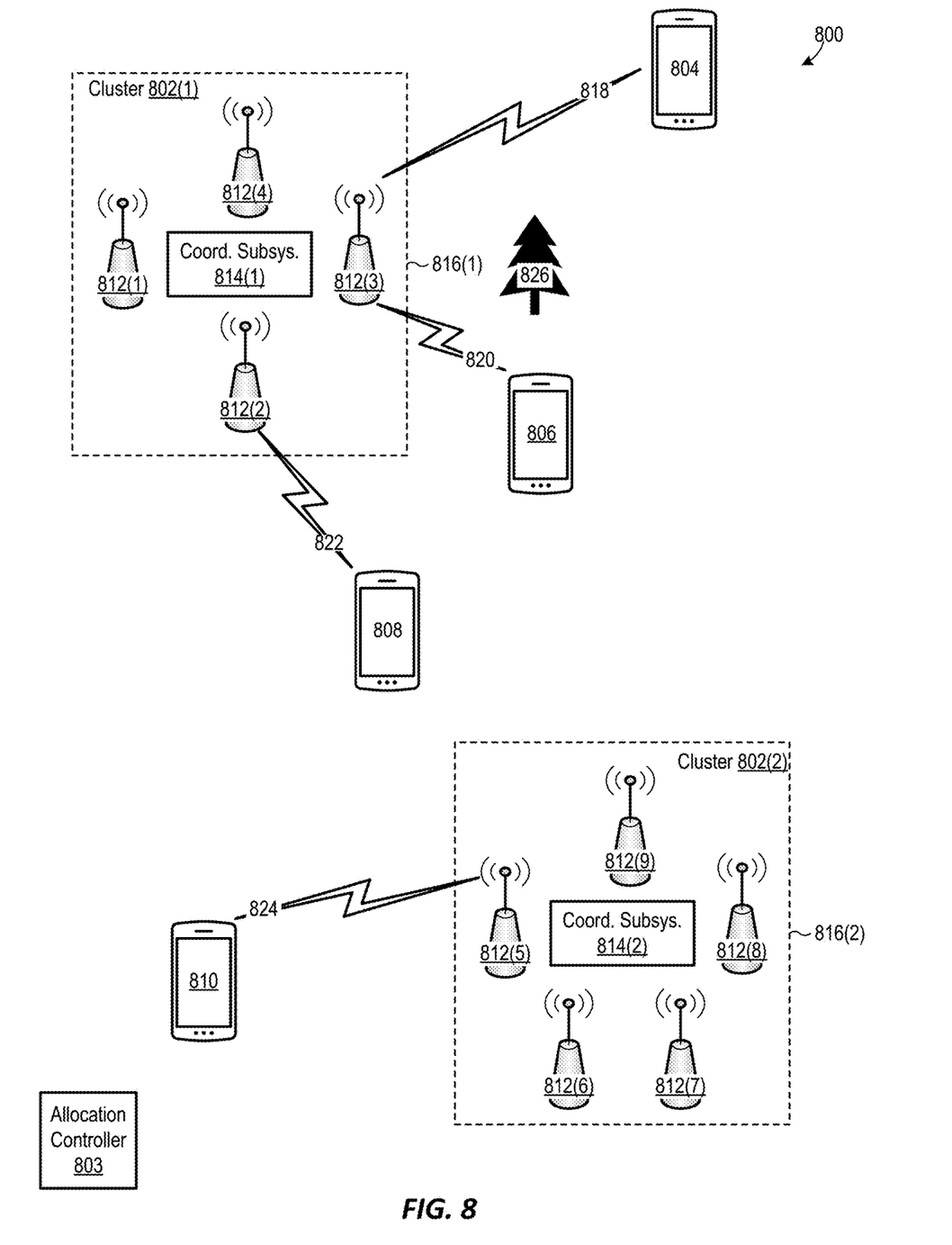
FIG. 8 is a block diagram of a wireless communication network which is configured to mitigate deterioration of a communication link, according to an embodiment.

FIG. 8 is a block diagram of a wireless communication network 800, which is one embodiment of the new systems and methods for mitigating communication link deterioration. Wireless communication network 800 includes a cluster 802(1), a cluster 802(2), an optional allocation controller 803, and wireless client devices 804, 806, 808, and 810. The number of clusters 802 and wireless client devices in wireless communication network 800 may vary. Wireless communication network 800 can, and typically will, include additional elements, such as additional clusters, additional wireless client devices, and one or more wireless network cores, which are not shown in FIG. 8 for illustrative clarity.

Each cluster 802 includes a plurality of wireless base stations 812 and a coordination subsystem 814. Specifically, cluster 802(1) includes wireless base stations 812(1)-812(4) and a coordination subsystem 814(1), which are located in a first geographic area 816(1). Cluster 802(2) includes wireless base stations 812(5)-812(9) and a coordination subsystem 814(2), which are located in a second geographic area 816(2). Connections between elements within clusters 802, as well as connections between clusters 802, are not shown for illustrate clarity. The number of wireless base stations 812 within each cluster 802 may vary. Each wireless base station 812 includes, for example, a LTE wireless base station, a 5G NR wireless base station, and/or a 6G wireless base station, operating in licensed radio frequency spectrum and/or in unlicensed radio frequency spectrum.

Each coordination subsystem 814 is configured to coordinate operation of the wireless base stations 812 of its respective cluster. For example, in some embodiments, each coordination subsystem 814 is configured to coordinate operation of wireless base stations 812 of its respective clusters 802 to perform COMP transmission. In certain embodiments, each coordination subsystem 814 is configured to coordinate wireless base stations 812 of its cluster 802 to perform one or more of CB, JT, and/or DPS. Furthermore, in some embodiments, coordination subsystems 814 of two or more clusters are configured to cooperate to perform COMP transmission using wireless base stations 812 of two or more clusters 802. In some embodiments, each coordination subsystem 814 is implemented by a computing device (not shown) executing instructions in the form of software and/or firmware stored in a memory (not shown), to perform the functions of the coordination subsystem. Each coordination subsystem 814 could be partially or fully integrated with another device, such as one or more wireless base stations 812, without departing from the scope hereof. Additionally, two or more coordination subsystems 814 could be partially or fully combined.

Wireless client devices 804 and 806 are each being served by wireless base station 812(3) via respective wireless communication links 818 and 820, in FIG. 8. Additionally, wireless client device 808 is being served by wireless base station 812(2) via wireless communication link 822, and wireless client device 810 is being served by wireless communication link 824, in FIG. 8. Although wireless client devices 804-810 are depicted as being mobile telephones, one or more of wireless client devices 804-810 could be another type of device without departing from the scope hereof. For example, in some alternate embodiments, one or more of wireless client devices 804-810 is a computer, a set-top device, a data storage device, an Internet of Things (IoT) device, an entertainment device, a computer networking device, a smartwatch, a wearable device with wireless capability, a medical device, a security device, a monitoring device, and/or a wireless access device (including, for example, an eNB, a gNB, a Wi-Fi-based wireless access point, an IAB access point, a microcell, a picocell, a femtocell, a macrocell, a Wi-Fi-based application, a satellite communication device, etc.). Each wireless client device 804-810 need not have the same configuration.

Figure 9:
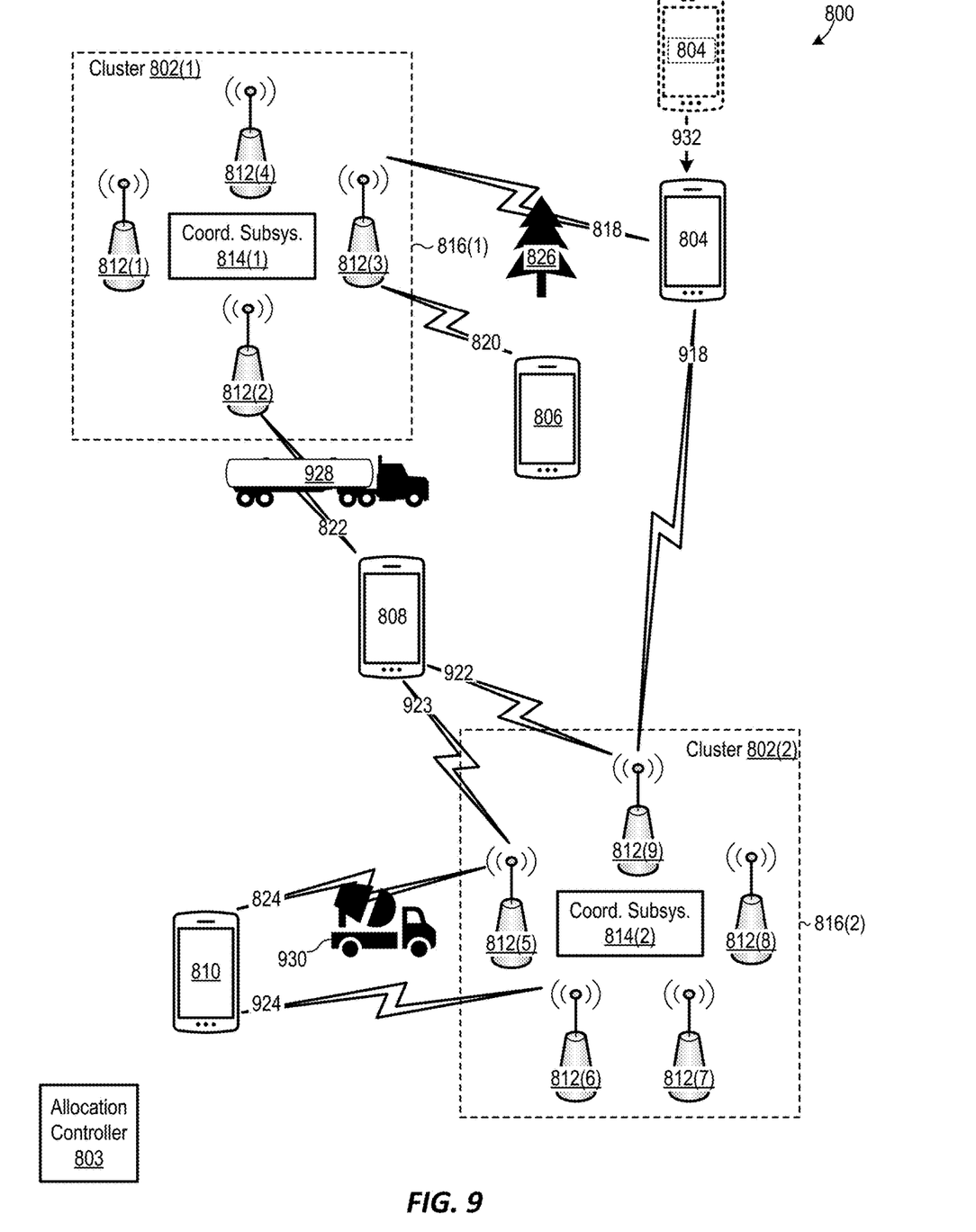
FIG. 9 is a block diagram of the FIG. 8 wireless communication network during a time when several wireless communication links have deteriorated.

FIG. 8 depicts each wireless client device 804-810 as being in line-of-sight with its serving wireless base station 812. FIG. 9, in contrast, illustrates wireless communication network 800 at a different time when obstacles between wireless base stations and wireless client devices cause several wireless communication links to deteriorate. Specifically, in the FIG. 9 scenario, wireless client device 804 has moved 932 such that wireless communication link 818 is now partially blocked by a tree 826, and trucks 928 and 930 partially block wireless communication link 822 and 824, respectively. However, coordination subsystems 814 are advantageously configured to mitigate deterioration of wireless communication links 818, 822, and 824 by causing each of wireless client devices 804, 808, and 810 to be temporarily served by one or more additional wireless base stations 812. Specifically, wireless client device 804 is temporarily served by wireless base station 812(9) via a wireless communication link 918, in addition to being served by wireless base station 812(3) via wireless communication link 818, in response to deterioration of wireless communication link 818 reaching a threshold value. Additionally, wireless client device 808 is temporarily served by each of wireless base stations 812(9) and 812(5) via respective wireless communication links 922 and 923, in addition to being served by wireless base station 812(2) via wireless communication link 822, in response to deterioration of wireless communication link 822 reaching a threshold value. Furthermore, wireless client device 810 is temporarily served by wireless base station 812(6) via a wireless communication link 924, in addition to being served by wireless base station 812(5) via wireless communication link 824, in response to deterioration of wireless communication link 824 reaching a threshold value. Such serving of wireless client devices 804, 808, and 810 by one or more additional wireless base stations at least partially compensates for deterioration of their respective original wireless communication links.

Coordination subsystems 814 are configured to release the additional wireless base stations temporarily serving wireless client devices 804, 808, and 810, for example, after a predetermined amount of time has elapsed, such as an amount of time typical required for a wireless client device to roam to a different wireless base station. Alternately or additionally, coordination subsystems 814 could be configured to release the additional wireless base stations temporarily serving wireless client devices 804, 808, and 810 in response to their respective original communication links 818, 822, and 824 improving, e.g., in response to deterioration of the original wireless communication links falling below a threshold value.

In some embodiments of wireless communication network 800, wireless base stations 812 are configured to temporarily allocate communication network resources to wireless client devices using a market-based approach. In these embodiments, wireless base stations 812 are sellers of communication network resources, such as bandwidth, and wireless client devices 804-810 are buyers of the communication network resources. For example, assume that wireless client device 804 moves 932 such that its original wireless communication link 818 is at least partially blocked by tree 826, as illustrated in FIG. 9. In response to deterioration of wireless communication link 818 reaching a threshold value, wireless client device 804 bids on communication network resources of one or more additional wireless base stations 812, to mitigate the communication link deterioration. Assume that wireless client device 804's bid is accepted by wireless base station 812(9). Wireless client device 804 buys additional network communication resources from wireless base station 812(9), resulting in coordination subsystem 814(2) causing wireless base station 812(9) to establish wireless communication link 918 with wireless client device 804. In some embodiments, multiple wireless client devices may generate competing bids for communication network resources from a single wireless base station 812

Figure 10:
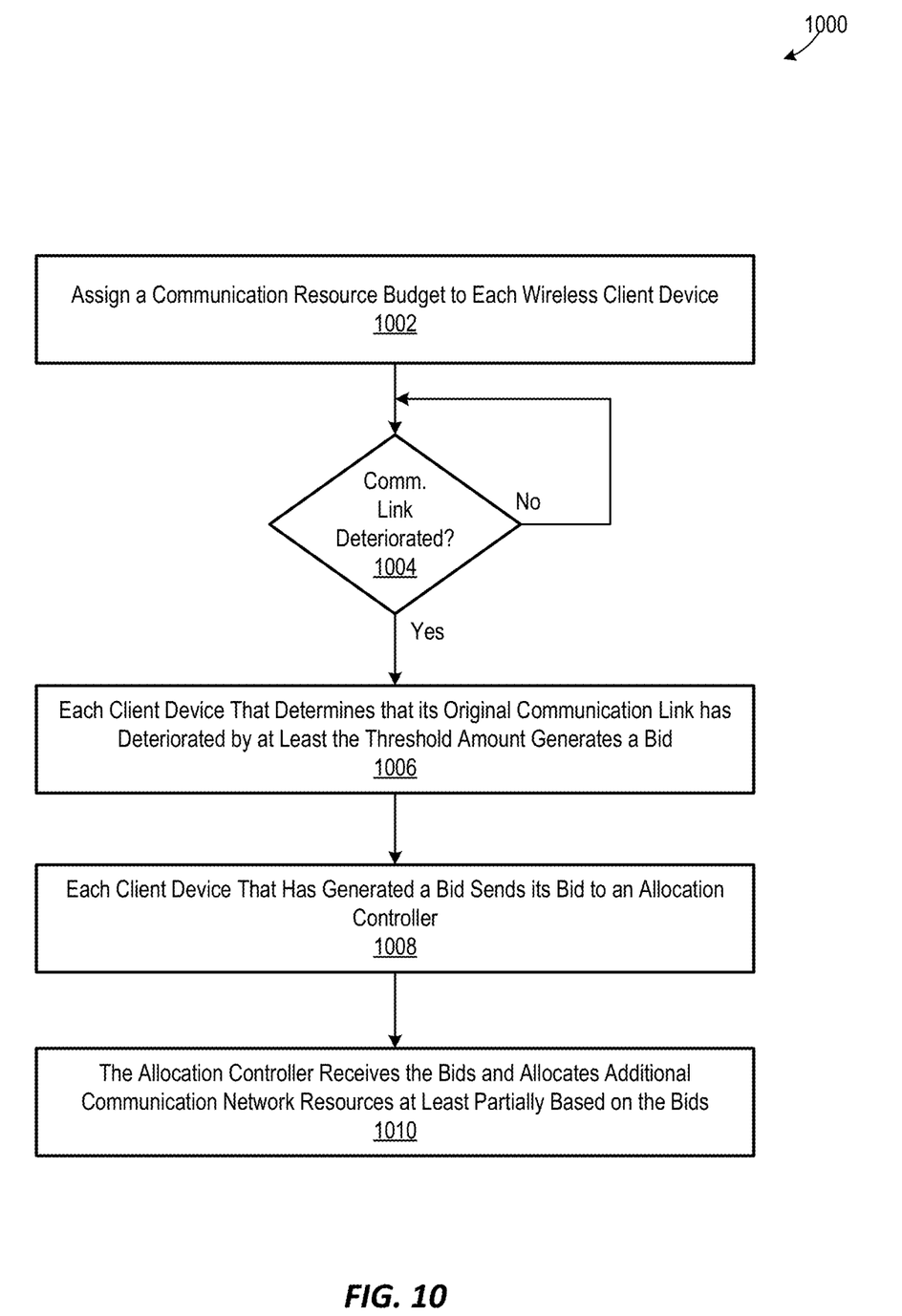
FIG. 10 is a flow chart of a method for automatically allocating communication network resources for mitigating communication link deterioration, according to an embodiment.

Discussed below with respect to FIG. 10 is one example of how a communication network could use a market-based approach to temporarily allocate communication network resources for mitigating communication link deterioration. Although FIG. 10 is discussed with respect to mitigating the communication link deterioration illustrated in FIG. 9, the method of FIG. 10 is not limited to this example application. Additionally, wireless communication network 800 is not limited to operating according to the FIG. 10 example.

FIG. 10 is a flow chart of a method 1000 for automatically allocating communication network resources for mitigating communication link deterioration. In a block 1002 of method 1000, each wireless client device receives a budget for communication network resources. In one example of block 1002, allocation controller 803 assigns each wireless client device 804-810 a budget for communication network resources. Each wireless client device 804-810 will use its budget, for example, to purchase communication network resources from one or more additional wireless base stations 812, to mitigate deterioration of a wireless communication link with its original serving wireless base station. Accordingly, each wireless client device 804-810 is limited by the amount of its budget to the quantity of communication network resources it can purchase from additional wireless base stations. Allocation controller 803 is optionally configured to periodically refresh each wireless client device's budget, such as on an hourly basis, a daily basis, a weekly basis, a monthly basis, as-needed basis, etc. In some embodiment, each wireless client device's budget is virtual, i.e., the budget is not linked to anything of real value. In some other embodiments, though, each wireless client device's budget is linked to something of real value.

Block 1004 is a decision block where each wireless client device determines whether its respective original wireless communication link has deteriorated. In the result of decision block 1004 is yes for any wireless client device, method 1000 proceeds to a block 1006. If the result of decision block 1004 is no for all wireless client devices, method 1000 returns to block 1004, such as after a predetermined delay time. In one example of decision block 1004, each of client devices 804, 808, and 810 determines that its respective original wireless communication link 818, 822, and 824 has deteriorated by at least a threshold amount, and method 1000 accordingly proceeds to block 1006. In block 1006, each client device that determined in decision step 1004 that its original wireless communication link has deteriorated by at least the threshold amount generates a bid, where the bid is for additional communication network resources from one or more wireless base stations in addition to the current serving wireless base station. In one example of block 1006, each of wireless client devices 804, 808, and 810 generates a respective bid for additional communication network resources. In a block 1008 of method 1000, each wireless client device generating a bid in block 1006 sends its respective bid to an allocation controller. In one example of block 1008, each of wireless client devices 804, 808, and 810 sends its respective bid to allocation controller 803.

In a block 1010 of method 1000, the bids are received at the allocation controller, and the allocation controller allocates additional communication network resources to each wireless client device that generated a bid, at least partially based on the amounts of the bids. As one example of block 1010, (a) allocation controller 803 allocates to wireless client device 804 communication resources of wireless base station 812(9) to support wireless communication link 918, (b) allocation controller 803 allocates to wireless client device 808 communication resources of wireless base stations 812(9) and 812(5) to respectively support wireless communication links 922 and 923, and (c) allocation controller 803 allocates to wireless client device 810 communication resources of wireless base station 812(6) to support wireless communication link 924, in response respective bids from client devices 804, 808, and 810.

In some embodiments, allocation controller 803 is configured to allocate available communication network resources to wireless client devices in an order determined by values of the bids received from the wireless client devices. For example, assume that wireless client devices 804, 808, and 810 request additional bandwidth of 30 MHz, 50 MHz, and 20 MHz, respectively. Additionally, assume that wireless client devices 804, 808, and 810 generate bids in the amount of 8, 10, and 2, respectively, for their additional requested bandwidth. Allocation controller 803 generates Table 2 below listing the requested additional bandwidth and associated bids. In some embodiments, Table 2 is visible to all wireless client devices in wireless communication system 800.

TABLE 2

| Wireless Client Device | Additional Bandwidth Requested | Bid Amount |
| --- | --- | --- |
| 804 | 30 MHz | 8 |
| 808 | 50 MHz | 10 |
| 810 | 20 MHz | 2 |

Allocation controller 803 also generates a table listing available bandwidth of each wireless base station. In some embodiments, wireless base stations are listed in a random order in this table. Table 3 below is one example of such table where wireless base stations 812(5), 812(9), and 812(6) have available bandwidths of 40 MHz, 40 MHZ, and 10 MHz, respectively, and the remaining wireless base stations 812 have no available bandwidth.

TABLE 3

| Wireless Base Station | Available Bandwidth |
| --- | --- |
| 812(4) | 0 |
| 812(2) | 0 |
| 812(5) | 40 MHz |
| 812(8) | 0 |
| 812(9) | 40 MHz |
| 812(1) | 0 |
| 812(7) | 0 |
| 812(6) | 10 MHz |
| 812(3) | 0 |

Allocation controller 803 next allocates available bandwidth of the Table 3 to wireless client devices in descending order of their bid amounts. In this example, wireless client device 808 provided the highest bid, and allocation controller 803 therefore allocates bandwidth to this client device before allocating bandwidth to any other client device. Allocation controller 803 starts with wireless base station 812(5) because this wireless base station is the first wireless base station in Table 3 with available bandwidth. Allocation controller 803 allocates all 40 MHz wireless base station 812(5)'s available bandwidth to wireless client device 808. However, wireless base station 812(5)'s request for 50 MHz of bandwidth has not been completely satisfied, so allocation controller 803 moves down Table 3 to wireless base station 812(9) and allocates 10 MHz of bandwidth from wireless base station 812(9) to wireless client device 808, so that wireless client device 808's total bandwidth request has been satisfied.

Allocation controller 803 next allocates bandwidth to wireless client device 804 because this client device provided the second highest bid. Wireless client device 804 requested 30 MHz of bandwidth, and wireless base station 812(9) has 30 MHz of bandwidth remaining after 10 MHz of its bandwidth being allocated to wireless client device 808. Allocation controller 803 accordingly allocates 30 MHz of bandwidth from wireless base station 812(9) to wireless client device 804.

Allocation controller 803 finally allocates bandwidth to wireless client device 810 because this wireless client device provided the lowest bid. Wireless client device 810 requested 20 MHz of bandwidth, but only 10 MHz of available bandwidth remains. Allocation controller 803 accordingly allocates 10 MHz of bandwidth from wireless base station 812(6) to wireless client device 810, and wireless client device 810's request for bandwidth is only partially met. It should be noted, thought, that wireless client device 810's requested bandwidth may have been fully met if the wireless client device had provided a higher bid.

Table 4 summarize the allocation of available bandwidth in the above example. Table 4 includes columns for the Seller, the Buyer, and the Amount of Sale. "Seller" refers to the wireless base station which provided bandwidth, "Buyer" refers to the wireless client device that was allocated the bandwidth, and "Amount of Sale" refers to the amount of the allocated bandwidth.

TABLE 4

| Seller | Buyer | Amount of Sale |
| --- | --- | --- |
| 812(5) | 808 | 40 MHz |
| 812(9) | 808 | 10 MHz |
| 812(9) | 804 | 30 MHz |
| 812(6) | 810 | 10 MHz |

Referring again to FIG. 8, in some embodiments, allocation controller 803 is implemented by a computing device (not shown) executing instructions in the form of software and/or firmware stored in a memory (not shown), to perform the functions of allocation controller 803. Although FIGS. 8 and 9 illustrate allocation controller 803 as being a discrete device, allocation controller 803 could be partially or fully integrated with one or more other elements of wireless communication network 800, such as with one or more allocation subsystems 814.

Additional Embodiments

While wireless communication networks 100 and 800 are discussed above in the context of cellular wireless communication networks, either of these wireless communication networks could be a different type of wireless communication network, including but not limited to a Wi-Fi wireless communication network, a Bluetooth communication network, or a Satellite wireless communication network. For example, the wireless base stations of wireless communication networks 100 and 800 could be Wi-Fi wireless base stations, satellite ground stations, or satellites. Furthermore, each of wireless communication networks 100 and 800 could be modified to be at least partially a wireline communication network, without departing from the scope hereof. For example, wireless base stations 110 and 812 could be replaced with modems, optical network units (ONUs), optical network terminals (ONTs), and/or other devices capable of serving client devices, with appropriate changes to their associated networks. Accordingly, the wireless base stations discussed above could be replaced with "client serving devices," where a "client serving device" is any device capable of serving one or more wireless or wireline clients. Thus, a client serving device includes, but is not limited to, a wireless base station, a ONU, an ONT, and/or a modem.

Combinations of Features

Features described above may be combined in various ways without departing from the scope hereof. The following examples illustrate some possible combinations.

(A1) A method for market-based mitigation of communication link deterioration includes (1) receiving, at a first client device, a communication network resource budget, (2) determining that deterioration of a first communication link between the first client device and a first network serving device has reached a threshold value, and (3) in response to determining that deterioration of the first communication link has reached the threshold value, generating a bid for additional communication network resources.

(A2) The method denoted as (A1) may further include using at least part of the communication network resource budget to purchase communication network resources from at least a second network serving device.

(A3) In the method denoted as (A2), the first client device may be a first wireless client device, the first network serving device may be a first wireless base station, and the second network serving device may be a second wireless base station.

(A4) In the method denoted as (A3), each of the first and second wireless base stations may be part of a common cluster of wireless base stations.

(A5) In any one of the methods denoted as (A2) through (A4), the communication network resources purchased from at least the second network serving device may include communication network bandwidth.

(A6) Any one of the methods denoted as (A2) through (A5) further includes purchasing communication network resources from at least the second network serving device for a predetermined time duration.

(A7) In any one of the methods denoted as (A1) through (A6), an amount of the bid for additional communication network resources is proportional to a need of the first client device for additional communication resources.

(A8) Any one of the methods denoted as (A1) through (A7) may further include sending the bid from the first client device to an allocation controller.

(B1) A method for market-based allocation of communication network resources includes (1) receiving a bid for additional communication network resources from a plurality of client devices and (2) allocating additional communication network resources to the plurality client devices, at least partially based on the bids for additional communication network resources from the plurality of client devices.

(B2) In the method denoted as (B1), allocating additional communication network resources to the plurality client devices may include allocating communication network resources of at least a first network serving device and a second network serving device to a first client device of the plurality of client devices.

(B3) The method denoted as (B2) may further include coordinating the first and second network serving devices to achieve wireless beam forming with respect to the first client device.

(B4) In the method denoted as (B1), allocating additional communication network resources to the plurality client devices may include allocating resources of one or more of a plurality of wireless base stations to the plurality of client devices, and each of the plurality of client devices may be a respective wireless client device.

(B5) In the method denoted as (B4), each wireless base station may be part of a common cluster of wireless base stations.

(C1) A method for market-based allocation of communication network resources includes (1) receiving, at an allocation controller, respective bids for communication network resources from a plurality of clusters of network serving devices, and (2) allocating respective communication network resources among the plurality of clusters of network serving devices at least partially based on an amount of the respective bid from each cluster.

(C2) In the method denoted as (C1), allocating respective communication network resources among the plurality of clusters of network serving devices at least partially based on an amount of the respective bid from each cluster may include using a proportional share technique to allocate communication network resources among the plurality of clusters.

(D1) A method for market-based allocation of communication network resources includes (1) predicting, at a cluster of network serving devices, an amount communication network resources collectively needed by the cluster of network serving devices, (2) generating, at the cluster of network serving devices, a bid for communication network resources, at least partially based on the amount of communication network resources collectively needed by the cluster of network serving devices, and (3) sending the bid to an allocation controller.

(D2) The method denoted as (D1) may further include (1) receiving a respective bid for cluster communication network resources from each network serving device of the cluster of network serving devices and (2) allocating cluster communication network resources to each network serving device at least partially based on its respective bid.

(D3) In the method denoted as (D2), allocating cluster communication resources to each network serving device at least partially based on its respective bid may include using a proportional-share technique to allocate communication network resources among the plurality of network serving devices of the cluster.

(D4) In any one of the methods denoted as (D1) through (D3), the cluster communication network resources may include at least one of cluster communication network bandwidth and cluster antenna access.

(D5) In any one of the methods denoted as (D1) through (D4), each network serving device of the cluster may include a respective wireless base station.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for market-based mitigation of communication link deterioration, the method comprising:
receiving, at a first client device, a communication network resource budget assigned to the first client device for the purpose of enabling the first client device to mitigate deterioration of a wireless communication link with a wireless base station serving the client device by purchasing additional communication network resources;
determining that deterioration of a first wireless communication link between the first client device and a first wireless base station has reached a threshold value, the deterioration of the first wireless communication link at partially resulting from interference with communication signals transmitted between the first client device and the first wireless base station caused by movement of the first client device;
in response to determining that the deterioration of the first wireless communication link has reached the threshold value, generating a bid for additional communication network resources; and
in response to acceptance of the bid for additional communication network resources, using at least part of the communication network resource budget to purchase communication network resources of a second wireless base station such that the first client device is concurrently served by (i) the first wireless communication link between the first client device and the first wireless base station and (ii) a second wireless communication link between the first client device and the second wireless base station, while the deterioration of the first wireless communication link between the first client device and the first wireless base station is greater than or equal to the threshold value, wherein each of the first and second wireless base stations is part of a common cluster of wireless base stations.

2. The method of claim 1, wherein the purchased communication network resources of the second wireless base station comprise communication network bandwidth.

3. The method of claim 1, further comprising purchasing the communication network resources of the second wireless base station for a predetermined time duration.

4. The method of claim 3, wherein an amount of the bid for additional communication network resources is proportional to a need of the first client device for additional communication network resources.

5. The method of claim 3, further comprising sending the bid from the first client device to an allocation controller.

6. The method of claim 3, further comprising coordinating the first and second wireless base stations to achieve wireless beam forming with respect to the first client device.

7. The method of claim 2, wherein the interference with the communication signals transmitted between the first client device and the first wireless base station is further caused by blocking of the communication signals transmitted between the first client device and the first wireless base station.

8. A wireless client device, the wireless client device being configured to:
receive a communication network resource budget assigned to the wireless client device for the purpose of enabling the wireless client device to mitigate deterioration of a wireless communication link with a wireless base station serving the wireless client device by purchasing additional communication network resources;
determine that deterioration of a first wireless communication link between the wireless client device and a first wireless base station has reached a threshold value, the deterioration of the first wireless communication link at partially resulting from interference with communication signals transmitted between the wireless client device and the first wireless base station caused by movement of the first client device;
in response to determining that the deterioration of the first wireless communication link has reached the threshold value, generate a bid for additional communication network resources; and
in response to acceptance of the bid for additional communication network resources, use at least part of the communication network resource budget to purchase communication network resources of a second wireless base station such that the wireless client device is concurrently served by (i) the first wireless communication link between the wireless client device and the first wireless base station and (ii) a second wireless communication link between the wireless client device and the second wireless base station, while the deterioration of the first wireless communication link between the first client device and the first wireless base station is greater than or equal to the threshold value, wherein each of the first and second wireless base stations is part of a common cluster of wireless base stations.

9. The wireless client device of claim 8, wherein the purchased communication network resources of the second wireless base station comprise communication network bandwidth.

10. The wireless client device of claim 8, wherein the wireless client device is further configured to purchase the communication network resources of the second wireless base station for a predetermined time duration.

11. The wireless client device of claim 8, wherein an amount of the bid for additional communication network resources is proportional to a need of the wireless client device for additional communication network resources.

* * * * *